United States Patent [19]

Morihara et al.

[11] Patent Number: 5,426,932
[45] Date of Patent: Jun. 27, 1995

[54] FLUIDIZED BED COMBINED CYCLE POWER GENERATING PLANT WITH METHOD TO DECREASE PLANT RESPONSE TIME TO CHANGING OUTPUT DEMAND

[75] Inventors: Atsushi Morihara, Katsuta; Hiroshi Matsumoto, Ibaraki; Katsunori Ouchi, Hitachi; Jinichi Tomuro; Nobuyuki Hokari, both of Katsuta; Masahide Nomura, Hitachi, all of Japan

[73] Assignee: Hitachi, Ltd., Tokyo, Japan

[21] Appl. No.: 727

[22] Filed: Jan. 5, 1993

[30] Foreign Application Priority Data

Jan. 10, 1992 [JP] Japan .................................. 4-002872

[51] Int. Cl.⁶ ............................................. F02C 6/00
[52] U.S. Cl. ................................. 60/39.182; 60/39.3; 60/39.25
[58] Field of Search ................ 60/39.182, 39.3, 39.25, 60/39.52, 39.29; 431/7, 170

[56] References Cited

U.S. PATENT DOCUMENTS

| | | | |
|---|---|---|---|
| 3,762,162 | 10/1973 | Miura et al. | 60/39.182 |
| 4,313,300 | 2/1982 | Wilkes et al. | 60/39.182 |
| 4,380,147 | 4/1983 | Zaba | 60/39.182 |
| 4,468,923 | 9/1984 | Jorzyk et al. | 60/39.182 |
| 4,660,375 | 4/1987 | Hyde et al. . | |

FOREIGN PATENT DOCUMENTS

| | | |
|---|---|---|
| 58-143129 | 8/1983 | Japan . |
| 62-29708 | 2/1987 | Japan . |
| 62-279208 | 12/1987 | Japan . |
| 1-217108 | 8/1989 | Japan . |
| 022715 | 1/1992 | Japan .................................. 60/39.52 |

*Primary Examiner*—Timothy S. Thorpe
*Attorney, Agent, or Firm*—Antonelli, Terry, Stout & Kraus

[57] ABSTRACT

A combined cycle power generating plant has a fluidized bed furnace and a heat exchanger disposed therein, a steam turbine which is driven by steam generated in the heat exchanger and a gas turbine which is driven by combustion gas generated in the fluidized bed furnace. If the output of the whole of the plant is increased, the pressure in the fluid bed furnace is increased by supplying water into the fluidized bed furnace and then the amount of steam generated in the heat exchanger is increased by elevating the height of the fluidized bed.

6 Claims, 8 Drawing Sheets

FLUIDIZED BED COMBINED CYCLE POWER GENERATING PLANT WITH METHOD TO DECREASE PLANT RESPONSE TIME TO CHANGING OUTPUT DEMAND

BACKGROUND OF THE INVENTION

1. Field of the Invention

The present invention relates to a combined cycle power generating plant having a fluidized bed furnace having a heat exchanger disposed therein; a steam turbine which is driven by steam generated in the heat exchanger and a gas turbine which is driven by combustion gas generated in the fluidized bed furnace and a method for operating the same.

2. Related Art

A prior art power generating plant having a fluidized bed furnace having a heat exchanger disposed therein, a steam turbine which is driven by steam generated in the heat exchanger and a gas turbine which is driven by combustion gas generated in the fluidized bed furnace is disclosed in Japanese Unexamined Patent publication No. Tokkai-Hei 1-217108. This power generating plant includes a storage tank for storing a bed material therein as well as the fluidized bed furnace.

The fluidized bed furnace has recently attracted interest since it is capable of removing nitrogen oxides (NOx) and sulfur oxide (SOx). It is necessary to keep the temperature of the fluidized bed at the most appropriate temperature in such a manner that the removal reaction of the sulfur oxides and nitrogen oxides proceeds properly.

Therefore, in order to control the temperature in the fluidized bed so that it falls within a predetermined range of temperature, the contact area between the fluidized bed furnace and a heat exchanger (heat exchanging surface area) is changed by transferring a bed material between the fluidized bed furnace and the storage tank to change the bed height in the fluidized bed furnace. The heat transfer rate is thus increased or decreased for controlling the temperature of the fluidized bed.

If the output of the whole of the plant is considered, the plant is operated as follows:

The heat exchanging surface area of a heat exchanger is increased by elevating the bed height so that the amount of steam generated in the heat exchanger, that is, the amount of steam supplied to the steam turbine is increased for increasing the output of the steam turbine as shown in FIG. 9.

On the other hand, in order to increase the output of the gas turbine, it is necessary to elevate the temperature of the combustion gas and to increase the pressure of the combustion gas. However, the output of the gas turbine can not be actively increased since it is necessary to maintain the temperature of the combustion gas in a predetermined range Of temperature as mentioned above. Accordingly, increasing of the output of the gas turbine is achieved by increasing the pressure of the combustion gas. The pressure of the combustion gas, that is, the pressure in the furnace is increased by increasing the amount of supplied fuel to elevate the bed height. However, the increase in the rate of the pressure in the furnace is slow as shown in FIG. 9. Accordingly, considering a single gas turbine, although the output thereof increases to some extent, the output of the gas turbine is directed to a compressor which is directly connected to the gas turbine. The output from the gas turbine to a component external of the system is not readily increased as shown in FIG. 10.

If the increase in output of the whole of the plant is achieved, the gas turbine output does not readily increase although the steam turbine output increases. Furthermore, since the change in the bed height of the fluidized bed furnace involves the movement of the bed material which is a powdery material, the response of the gas turbine is so low that the increase in the output of the steam turbine tends to be delayed. Therefore, there is the problem in that the response of the increase in the whole of the plant is slow.

SUMMARY OF THE INVENTION

The present invention is made for overcoming the above mentioned problem of the prior art. It is therefore an object of the present invention to provide a combined cycle electric power generating plant having a high response to the increase in the output of the whole of the plant, a method of operating the same, a fluidized bed furnace and a fluidized bed apparatus.

In order to accomplish the above mentioned object, there is provided a method of operating a generating plant having a fluidized bed furnace having a heat exchanger disposed therein, a steam turbine which is driven by steam generated in the heat exchanger and a gas turbine which is driven by combustion gas generated in the fluidized bed furnace, characterized in that the output of the gas turbine is changed prior to changing the output from the steam turbine if the output of the entire combined cycle power generating plant is changed.

An approach to increasing the gas turbine output includes to increasing the pressure in a fluidized bed furnace or elevating the temperature of the combustion gas.

It is better to increase the pressure in the fluidized bed furnace by supplying water to the fluidized bed to convert it into steam. At this time, it is preferable to lower the bed height while supplying fuel. The water may be mere water or wet steam.

In a combined cycle power generating plant including a fluidized bed furnace having a heat exchanger disposed therein, a steam turbine which is driven by steam generated in the heat exchanger and a gas turbine which is driven by combustion gas generated in the fluidized bed furnace, the gas turbine generally has a higher response than that of the steam turbine. Therefore, the response of the whole of the plant can be enhanced by changing the output of the gas turbine prior to changing the steam turbine output even if the rate of change in the steam turbine output is decreased slightly.

Specifically, an approach to increase the steam turbine output includes increasing the pressure of the combustion gas generated in the fluidized bed furnace or elevating the temperature of the combustion gas.

Since it is necessary to maintain the fluidized bed at a temperature which is appropriate for the removing reaction of nitrogen oxides and sulfur oxides, it is not possible to elevate the temperature of the combustion gas by lowering the temperature of the fluidized bed. However, it is possible to elevate the temperature of the combustion gas by providing a subsidiary combustor between the fluidized bed furnace and the gas turbine. Therefore, the response of the whole of the plant can be enhanced by operating the subsidiary combustor to preferentially increase the gas turbine output if the output of the whole of the plant is increased.

Specifically, methods of increasing the pressure of the combustion gas include providing a subsidiary compressor, supply an exhaust gas having a relatively high pressure emitted from a gas turbine to a compressor so as to supply compressed air to the fluidized bed furnace and supply water to a fluidized bed. The response of the whole of the plant can be enhanced by conducting any of these approaches to preferentially increase the gas turbine output when the output of the whole of the plant is increased.

The approach of supplying water to the fluidized bed will be described.

When the output of the whole of the plant is increased, the fluidized bed is supplied with fuel together with water. The water is converted into steam by removing heat in the fluidized bed for increasing the pressure in the furnace. At this time the ratio of fuel in the fluidized bed is increased to increase the amount of generated heat and to reduce heat transfer to the heat exchanger by supplying fuel thereto while lowering the bed height conversely to the prior art and the pressure in the furnace can be effectively increased by increasing the energy which is required for converting water into steam. The increase in pressure in the furnace also increases the gas turbine output.

In such a manner, the approach of supplying water to the fluidized bed is considerably advantageous over the other approaches in view of manufacturing cost since it can be achieved by a very simple plant.

DESCRIPTION OF THE PREFERRED EMBODIMENT

Various embodiments of the present invention will be described with reference to drawings.

A first embodiment of the present invention will be described with reference to FIGS. 1 to 6.

Figure 2:
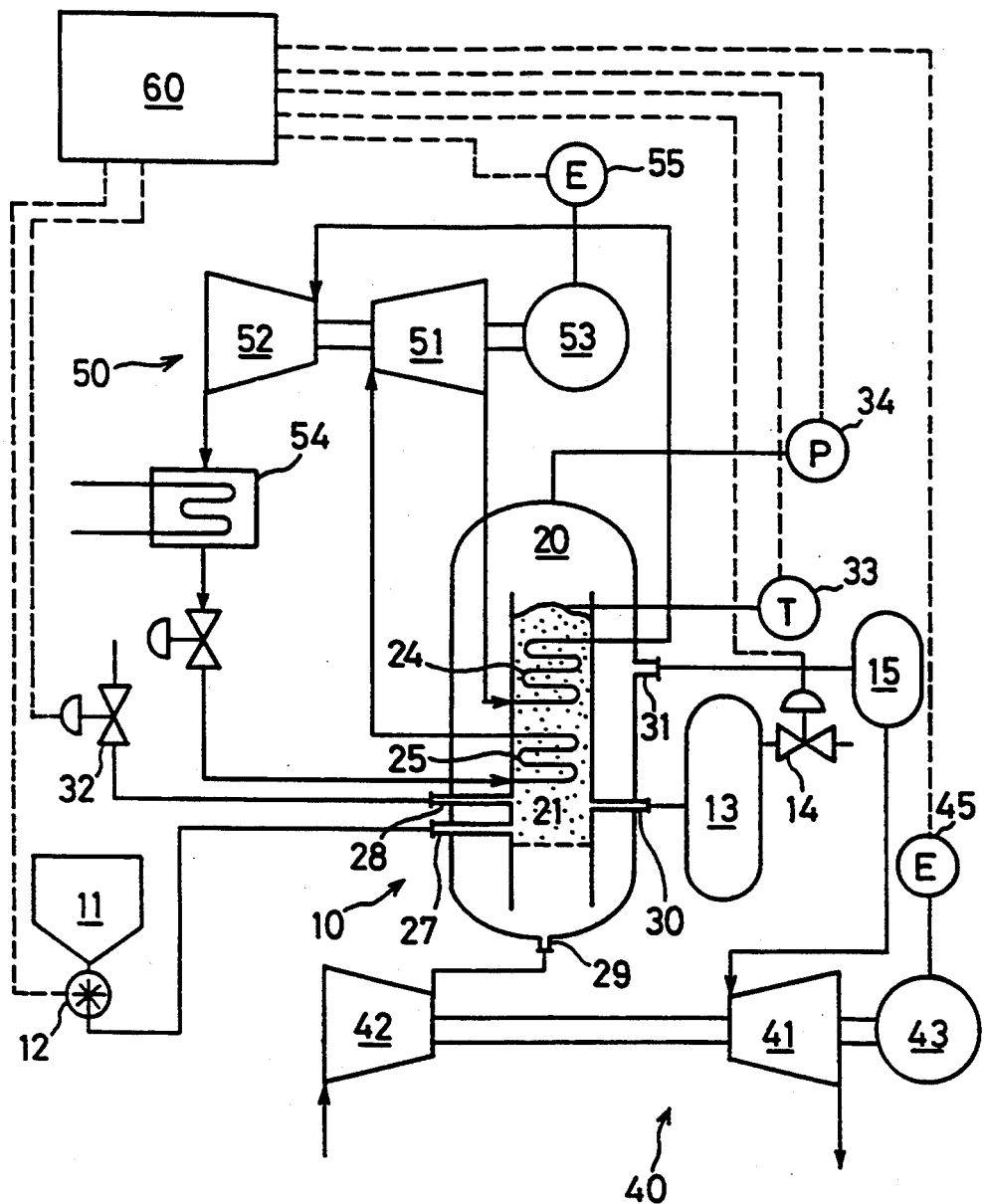
FIG. 2 is a system diagram showing a combined cycle electric power generating plant in the first embodiment of the present invention.

A combined cycle power generating plant of the present embodiment comprises a pressurized fluidized bed coal combustor 10, a gas turbine electric power generating system 40, a steam turbine electric power generating system 50 and a controller 60 for controlling the combustor and systems as shown in FIG. 2.

The pressurized bed coal combustor 10 comprises a pressurized fluidized bed furnace 20, a coal hopper 11 for storing coal which will be supplied to the pressurized fluidized bed furnace 20, a storage tank 13 for loading and unloading a bed material which forms the fluidized bed 21 into and from the pressurized fluidized bed furnace 20 and a dust separator 15 for removing dust and the like in the combustion gas generated in the pressurized fluidized bed furnace 20.

Figure 3:
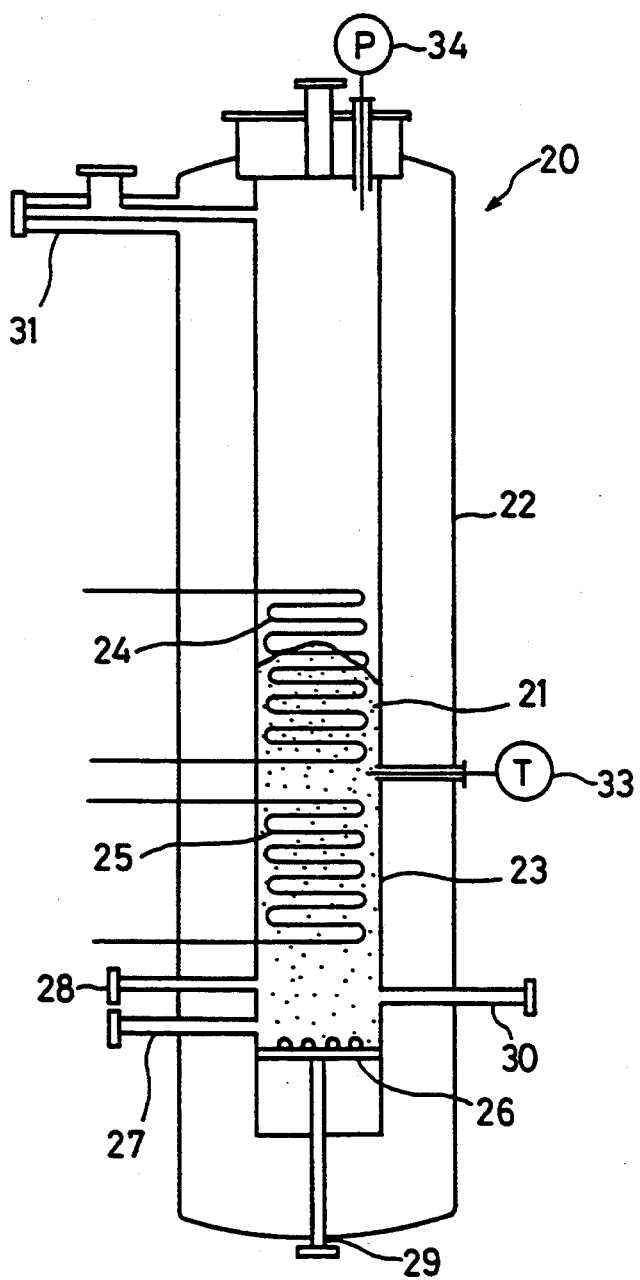
FIG. 3 is a sectional view showing the whole of a fluidized bed furnace in the first embodiment.

The pressurized fluidized bed furnace 20 comprises an outer pressure resistant vessel 22; an inner vessel 23 in which the fluidized bed 21 is formed; a reheater 24 and super heater 25 which are disposed in the inner vessel 23; and a distributor 26 which is provided in the lower portion of the inner vessel 23 as shown in FIG. 3. The outer and inner vessels 22 and 23 are provided with a coal supply nozzle 27 for supplying coal to the inside of the inner vessel 23, a water injection nozzle 28 for injecting water into the inner vessel 23, a bed material feeding nozzle 30 for feeding the bed material to and from the storage tank 13, and a discharge nozzle 31 for discharging the combustion gas generated in the inner vessel 23. A water flow rate adjusting valve 32 is connected to the water supply nozzle 28 for adjusting the flow rate of water from a water source. The pressurized fluidized bed furnace 20 is further provided with a thermometer 33 for measuring the temperature in the inner vessel 23 and a pressure gauge 34 for measuring the pressure in the inner casing 23.

The coal hopper 11 is provided with a rotary valve 12 for adjusting the amount of coal which is discharged from the hopper 11. The discharge slot of the rotary valve 12 is connected to the coal supply nozzle 27 of the pressurized fluidized bed furnace 20. A nitrogen flow control valve 14 for adjusting the quantity of pressurized nitrogen from the pressurized nitrogen source is connected to the storage tank 13 which is in turn connected to the bed material feeding nozzle 30 of the pressurized fluidized bed furnace 20.

The gas turbine electric power generating system 40 comprises a gas turbine 41 which is driven by the combustion gas generated by the pressurized fluidized bed furnace 20 and is fed via the dust separator 15, a compressor 42 for compressing the air and for supplying the compressed air to the fluidized bed furnace 20 and the gas turbine electric power generator 43 which is rotated by the gas turbine 41 for generating electric power as shown in FIG. 2. The compressor 42 is directly coupled to a rotor of the gas turbine 41 so that it is driven by the gas turbine 41.

The steam turbine power generating system 50 comprises a high pressure steam turbine 51 which is driven by the steam generated in the super heater 25 of the pressurized fluidized bed furnace 20, a low pressure steam turbine 52 which is driven by the steam generated in the reheater 24 of the pressurized fluidized bed furnace 20 and a steam turbine power generator 53 which is driven by these turbines 51 and 52 for generating electric power and a condenser 54 for condensing the steam discharged from the reheater 52 into water as shown in FIG. 2.

Figure 4:
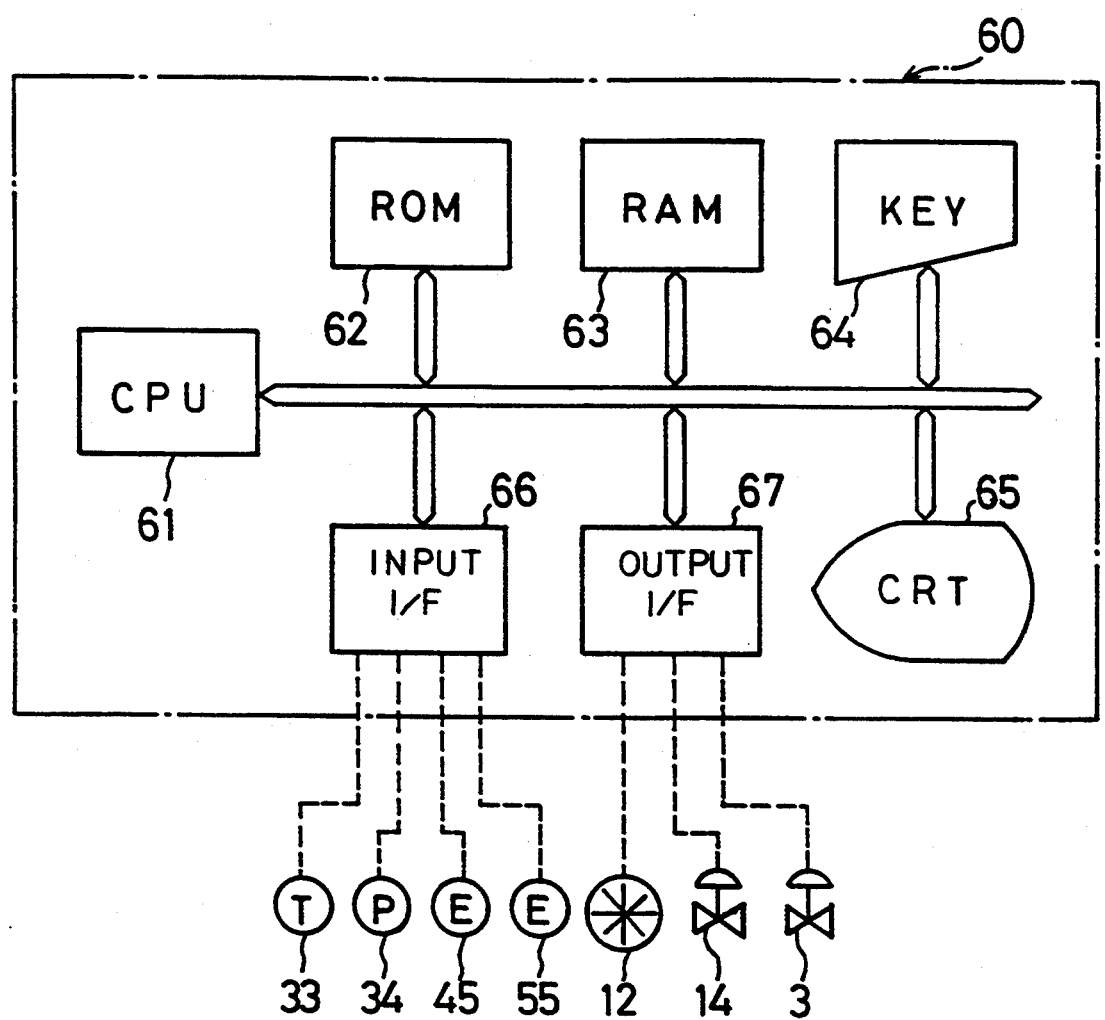
FIG. 4 is a block diagram showing the circuit of a controller in the first embodiment of the present invention.

The controller 60 comprises a CPU 61 for executing various operations, a ROM 62 and a RAM 63 for storing programs which are executed by a CPU 61 and various data, a key-board 64 for the entry of various instructions, a CRT 65 for displaying various data, etc., an input interface through which various data are input and an output interface 67 through which various control data, etc. are output as shown in FIG. 4.

In the present embodiment, instruction means is formed by the controller 60.

Now operation of the present embodiment will be described.

Basic operation of the combined cycle power generating plant will first be described.

The coal in the coal hopper 11 is supplied to the inside of the fluidized bed furnace 20 from the coal supply nozzle 27 via the rotary valve 12. Compressed air is supplied to the inside of the fluidized bed furnace 20 from the compressor 42. The coal is mixed with the compressed air and they are combusted in the fluidized bed furnace 20. The combustion gas generated in the furnace 20 is subjected to dust elimination by the dust separator 15 and is thereafter supplied to drive the gas turbine 41. The driving power generated by the gas turbine 41 is transmitted to the compressor 42 and the gas turbine electric power generator 43. On the other hand, the steam which is generated by the super heater 25 of the fluidized bed furnace 20 is supplied to drive the high pressure steam turbine 51. The steam which is discharged from the high pressure steam turbine 51 is reheated by the reheater 24 in the fluidized bed furnace 20 and is then supplied to the low pressure steam turbine 52. After the steam drives the low pressure steam turbine 52, the steam is fed to the condenser 50. After the steam is condensed into water, the water is supplied to the super heater 25 again. The steam turbine electric power generator 53 is driven by these steam turbines 51 and 52 so as to generate electric power and which it then supplies externally.

The controller 60 usually controls the balance between the outputs of the generators 43 and 53 in response to the output signals from sensors provided for respective generators 43 and 53. The controller 60 controls the valve opening of the nitrogen flow control valve 14 connected to the storage tank 13 in response to signals from the thermometer 33 and the pressure gauge 34 of the fluidized bed furnace 20 so that the fluidized bed 21 is at a temperature appropriate for the reaction for the removal of sulfur oxides and nitrogen oxides. In other words, the bed material is moved between the fluidized bed furnace 20 and the storage tank 13 to change the height of the fluidized bed 21 by changing the relative pressure in the storage tank 13 to that in the fluidized bed furnace 20. This changes the heat exchanging surface area of the heat exchangers 24 and 25 to change the heat transfer rate of the fluidized bed 21 for the control of the temperature thereof.

Figure 1:
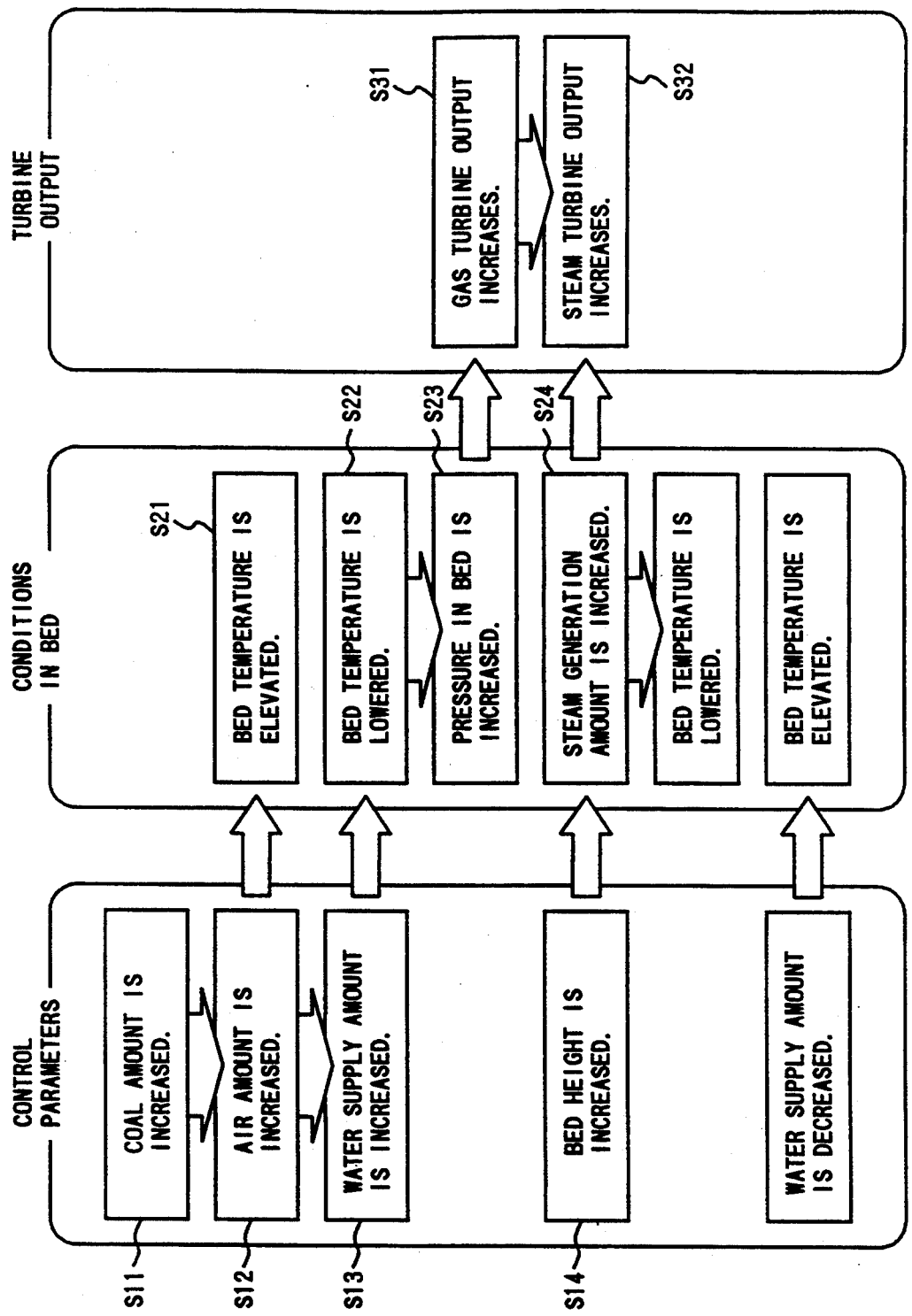
FIG. 1 is a flow chart showing the operation of a first embodiment of the present invention.
Figure 5:
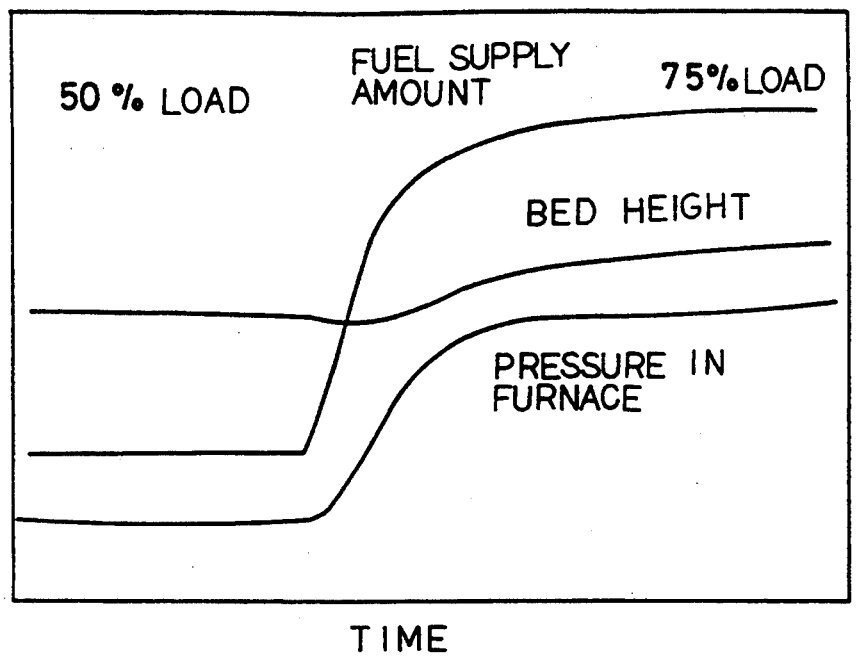
FIG. 5 is a graph showing changes in conditions in the fluidized bed furnace with time in the first embodiment of the invention.
Figure 6:
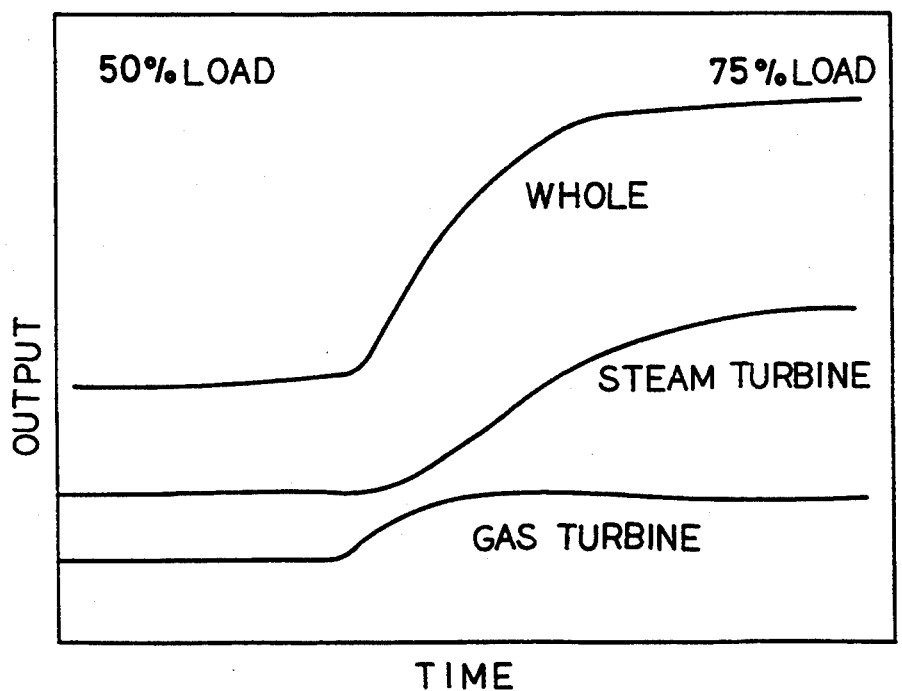
FIG. 6 is a graph showing the change in output from the combined cycle electric power generating plant in the first embodiment of the present invention.

Now, operation for increasing the output of the whole of the combined cycle power generating plant will be described with reference to FIGS. 1, 5 and 6. In the flow chart of FIG. 1, steps related with manipulated factors are designated with reference numerals in the 10s, steps related with changes in conditions in the bed are designated with reference numerals in the 20s and steps related with changes in turbine output are designated with reference numerals in the 30s.

In order to increase the output of the whole of the combined power generating plant, an instruction to increase the power is input through the keyboard 64 of the controller 60. Instruction to increase the output may be also conducted in response to a signal to increase the output, which is fed from outside the system as well as the entry through the keyboard 64.

Input of this instruction increases the quantity of coal from the coal hopper 11 and the compressed air from the compressor 42 (steps 11 and 12). The increase in the coal and the compressed air causes the temperature of the fluidized bed 21 to be elevated (step 21). The change in the temperature of the fluidized bed 21 is fed to the controller 60 from the thermometer 33. It is necessary to keep the temperature of the fluidized bed 21 within a predetermined temperature range. In this embodiment, the height of the bed is not increased as it is the prior art. The temperature of the fluidized bed 21 which tends to be elevated is suppressed by supplying the fluidized bed 21 with water (step 13). Supply of water to the fluidized bed 21 is carried out by the controller 60 for controlling the valve opening of the water flow rate control valve 32. The water which is supplied to the fluidized bed 21 absorbs the heat in the fluidized bed 21 to lower the temperature of the fluidized bed 21 (step 22) and becomes steam to abruptly increase the pressure in the fluidized bed furnace as shown in FIG. 5 (step 23). Accordingly, the output from the gas turbine abruptly increases (step 31) as shown in FIG. 6.

The height of the fluidized bed 21 is temporarily reduced by controlling the valve opening of the nitrogen flow control valve 14 which is connected to the storage tank 13 when water is supplied in the present embodiment since the gas turbine output increases as the pressure in the fluidized bed 20 increases. This aims at increasing the ratio of the fuel in the bed material thus increasing the amount of generated heat and decreasing the amount of heat absorbed by the heat exchangers 24 and 25 by decreasing the height of the fluidized bed while supplying coal. Therefore, the amount of generated steam increases, the pressure in the fluidized bed 20 abruptly increases, resulting in a more abrupt increase in the gas turbine output.

On the other hand, the steam turbine outputs tend to temporarily decrease since the height of the fluidized bed 21 decreases during this period of time. However, the steam turbine outputs do not actually decrease as shown in FIG. 6 since the responses of the steam turbines 51 and 52 are substantially low.

When the gas turbine output begins to increase, the height of the fluidized bed 21 is increased (step 14), the amount of steam generated in the heat exchangers 24 and 25 is increased (step 24) and the outputs of the steam turbines 51 and 52 are increased (step 32). Also water is not supplied into the fluidized bed furnace 20 if the temperature of the fluidized bed tends to rise during this period of time.

Generally, the gas turbine 41 which is driven by the combustion gas generated by the fluidized bed furnace 20 has a response which is faster than those of the steam turbines 51 and 52 which are driven by the steam generated by the heat exchangers 24 and 25 in the fluidized bed furnace 20. Accordingly, the response of the whole of the power plant to the increase in output thereof is enhanced by preferentially increasing the output of the gas turbine 41 having a faster response and thereafter increasing the outputs of the steam turbines 51 and 52.

Particularly, the response of the whole of the plant can be enhanced by simply providing means for supplying water to the inside of the fluidized bed furnace 20 and slightly changing control programs in accordance with the present embodiment. Therefore, the present embodiment is also advantageous in view of suppressing the manufacturing cost.

Although water is supplied to the fluidized bed furnace 20 in the present embodiment when the output of the whole of the plant is increased, water may be supplied when the temperature of the fluidized bed 21 is controlled. Supplying water to the fluidized bed 21 in usual operation in such a manner apparently involves wasteful consumption of the thermal energy. However, increasing the output of the gas turbine 41 by converting water into steam enables the thermal energy to be more effectively used than feeding the bed material to the storage tank 13 to waste the heat stored in the bed material.

Although the water to be supplied to the fluidized bed 21 is supplied from an independent water source in the present embodiment, it may be supplied from the condenser 54. This reduces the manufacturing cost.

It is of course possible that the fluidized bed 21 may be supplied with wet steam in lieu of water.

Figure 7:
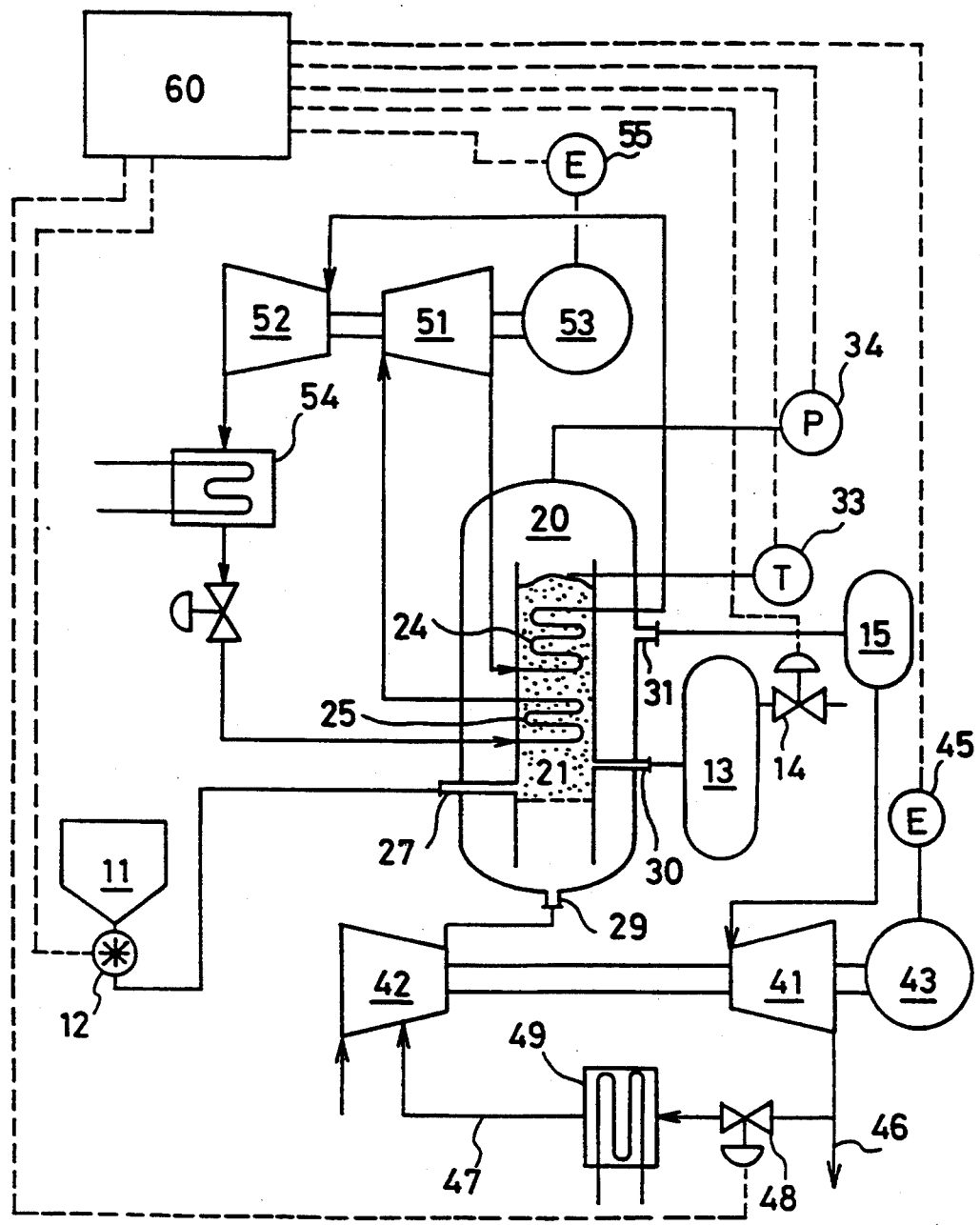
FIG. 7 is a system diagram showing the combined cycle electric power generating plant in a second embodiment of the present invention.

Now, a second embodiment of the present invention will be described with reference to FIG. 7.

The second embodiment is substantially identical with the first embodiment except that exhaust gas is fed to a compressor 42 from a gas turbine 41 while water is supplied to a fluidized bed 21 for increasing the gas turbine output in the first embodiment. Like components are represented by like reference numerals.

In other words, an exhaust pipe 46 of the gas turbine 41 is provided with an exhaust gas recirculating pipe 47 for returning the exhaust gas to the intermediate stage of the compressor 42, which is in turn provided with an exhaust gas flow control valve 48 and a cooler 49 for cooling the exhaust gas to such a temperature that the exhaust gas can be supplied to a compressor 42.

In normal operation of the plant, the exhaust gas from the gas turbine 41 is released into the atmosphere.

Since the gas turbine 41 is directly connected with the compressor 42 in such a plant, the output of the compressor 42 increases as a result of the increase in the output of the gas turbine 41. Accordingly, the output of the compressor 42 can not be increased in order to increase the output of the gas turbine 41. The compressor 42 generally does not have the capability of rapidly increasing the gas turbine output. Therefore, the gas turbine output can not be preferentially increased.

Accordingly, in the present embodiment, in order to increase the output of the whole of the plant, the relatively high pressure exhaust gas is fed into the compressor 42 by opening a exhaust gas flow control valve 48 to increase the pressure in the fluidized bed furnace 20 so that the gas turbine output is preferentially increased.

Therefore, the response of the whole of the plant at the time when the output increases can be enhanced by a relatively simple modification in the present embodiment also. Means for supplying water to the fluidized bed furnace 20 may be used together with means for returning the exhaust gas from the gas turbine 41 to the compressor 42 in the present embodiment also.

Figure 8:
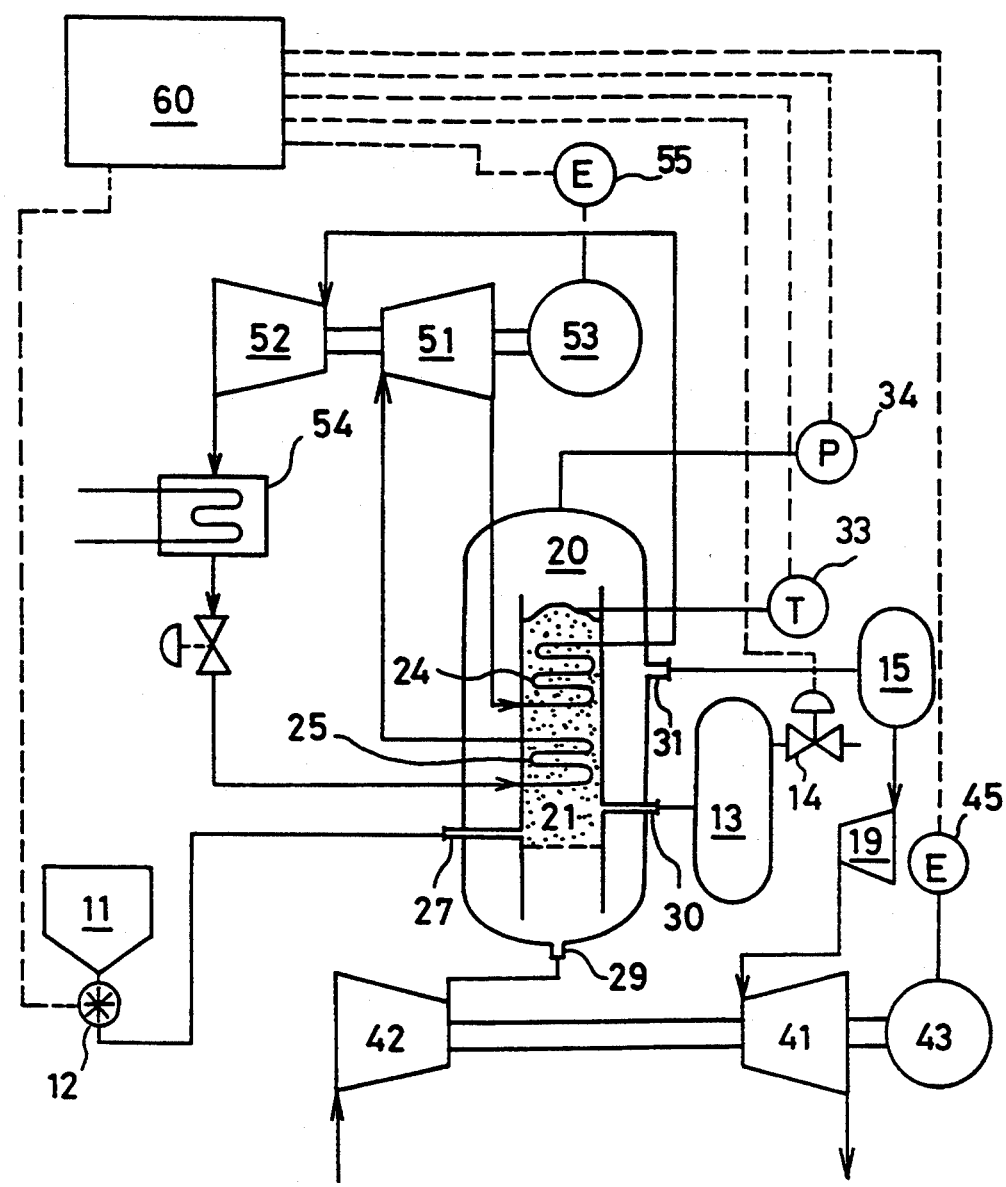
FIG. 8 is a system diagram showing a combined cycle electric power generating plant in a third embodiment of the present invention.
Figure 9:
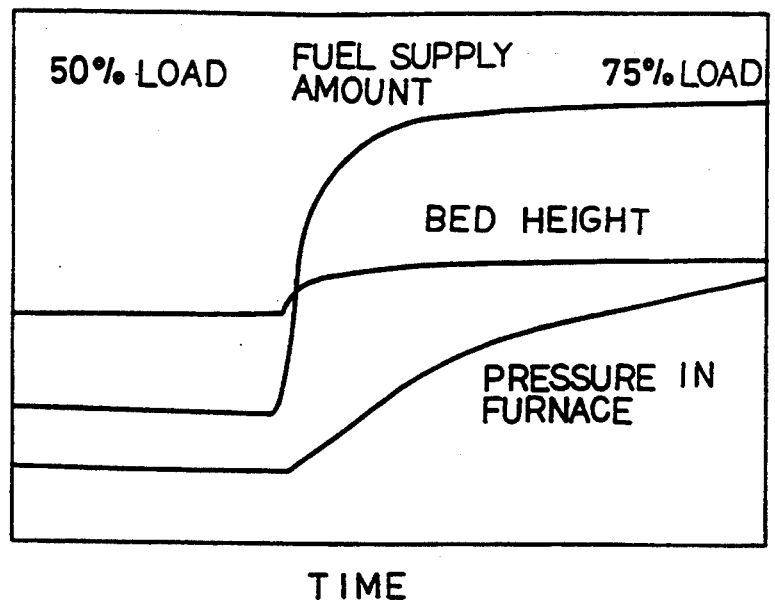
FIG. 9 is a graph showing the changes in conditions in a prior art fluidized bed furnace.
Figure 10:
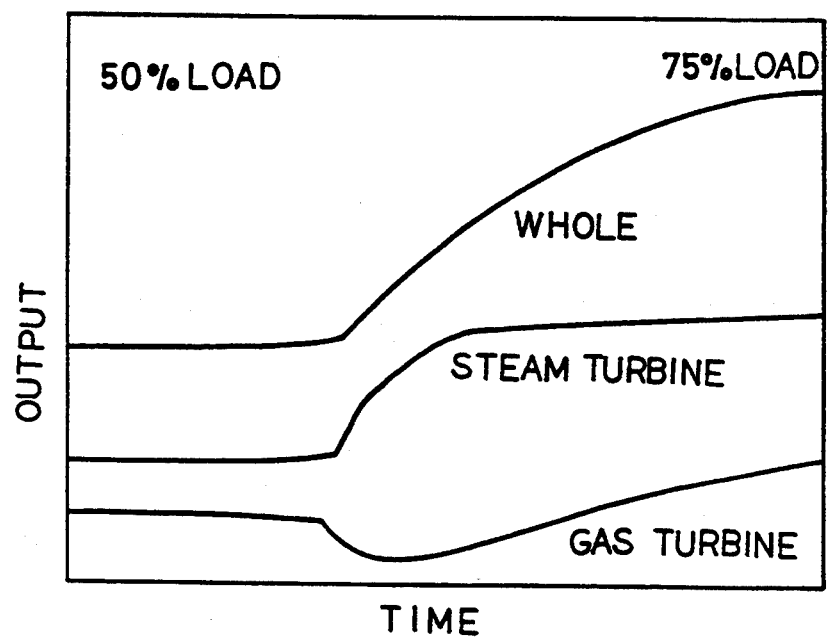
FIG. 10 is a graph showing the change in output from a prior art combined cycle electric power generating plant.

Alternatively, in order to preferentially increase the output of the gas turbine 41, an auxiliary compressor 19 may be provided between the dust separator 15 of the first embodiment and the gas turbine 41 as shown in FIG. 8. The auxiliary compressor 19 is driven to increase the gas turbine output when the output of the entire of the plant is increased. The auxiliary compressor 19 may be provided between the compressor 42 and the fluidized bed furnace 20 since it suffices for the compressor 19 to resultingly increase the pressure of the exhaust gas.

Alternatively, in order to preferentially increase the output of the gas turbine 41, a preliminary combustor may be provided at the position of the auxiliary compressor shown in FIG. 8 to elevate the temperature of the exhaust gas supplied to the gas turbine 41. In these cases, a greater increase in manufacturing cost than those of the first and second embodiments is inevitable since the auxiliary compressor 19 or a preliminary combustor is separately provided.

In accordance with the present invention, the response of the whole of the plant can be enhanced since the output of a gas turbine having a high response is increased prior to increasing the output of the steam turbine.

Particularly, the response of the whole of a plant of the type in which the increase in the gas turbine output is achieved by supplying water to the fluidized bed furnace can be enhanced with only a small increase in manufacturing cost.

What is claimed is:

1. A combined cycle power generating plant including a fluidized bed furnace including a fluidized bed furnace having a heat exchanger disposed therein, a steam turbine which is driven by steam generated in the heat exchanger and a gas turbine which is driven by combustion gas generated in the fluidized bed furnace;
the improvement comprising:
gas turbine output increasing means for increasing said gas turbine output preferentially to said steam turbine output: and
instructing means for instructing said gas turbine output increasing means to increase the output therefrom in response to an instruction to increase the outputs from both said gas and steam turbines, and further including a compressor for supplying compressed air to said fluidized bed furnace, said compressor being connected to said gas turbine so that said compressor may be driven by said gas turbine, and
in which said gas turbine output increasing means includes an auxiliary compressor for increasing the pressure of the combustion gas supplied to said gas turbine in response to an instruction from said instructing means to increase the output of said gas turbine.

2. A combined cycle power generating plant including a fluidized bed furnace having a heat exchanger disposed therein, a steam turbine which is driven by steam generated in the heat exchanger and a gas turbine which is driven by combustion gas generated in the fluidized bed furnace;
the improvement comprising:
gas turbine output increasing means for increasing said gas turbine output preferentially to said steam turbine output; and
instructing means for instructing said gas turbine output increasing means to increase the output therefrom in response to an instruction to increase the output from both said gas and steam turbines, and further including a compressor for supplying compressed air to said fluidized bed furnace and
in which said gas turbine output increasing means includes an exhaust gas line for introducing exhaust gas from said gas turbine to said compressor;

an exhaust gas flow control valve for increasing the flow rate of the exhaust gas introduced to said compressor in response to an instruction from said instructing means to increase the output from said gas turbine and further including a compressor for supplying compressed air to said fluidized bed furnace, said compressor being connected to said gas turbine so that said compressor may be driven by said gas turbine, and in which said gas turbine output increasing means includes a subsidiary compressor for increasing the pressure of the combustion gas supplied to said gas turbine in response to an instruction from said instructing means to increase the output of said gas turbine.

3. A combined cycle power generating plant including a fluidized bed furnace having a heat exchanger disposed therein, a steam turbine which is driven by steam generated in the heat exchanger and a gas turbine which is driven by combustion gas generated in the fluidized bed furnace:

the improvement comprising:

gas turbine output increasing means for increasing said gas turbine output preferentially to said steam turbine output; and instructing means for instructing said gas turbine output increasing means to increase the output therefrom in response to an instruction to increase the outputs from both said gas and steam turbines, and further including a storage tank for storing a bed material which will form a fluidized bed;

bed material transferring means for transferring said bed material between said storage tank and said fluidized bed furnace;

pressure measuring means for measuring the pressure in said fluidized bed;

temperature measuring means for measuring the temperature of said fluidized bed in said fluidized bed furnace; and bed material transfer rate instructing means for instructing the transfer rate of said bed material to said bed material transferring means.

4. A combined cycle power generating plant including a fluidized bed furnace having a heat exchanger disposed therein, a steam turbine which is driven by steam generated in the heat exchanger and a gas turbine which is driven by combustion gas generated in the fluidized bed furnace:

the improvement comprising:

gas turbine output increasing means for increasing gas turbine output preferentially to said steam turbine output; and instructing means for instructing said gas turbine output increasing means to increase the output therefrom in response to an instruction to increase the outputs from both said gas and steam turbines, and further including a compressor for supplying compressed air to said fluidized bed furnace and in which said gas turbine output increasing means includes an exhaust gas line for introducing exhaust gas from said gas turbine to said compressor; and an exhaust gas flow control valve for increasing the flow rate of the exhaust gas introduced to said compressor in response to an instruction from said instructing means to increase the output from said gas turbine, and further including a storage tank for storing a bed material which will form a fluidized bed;

bed material transferring means for transferring said bed material between said storage tank and said fluidized bed furnace;

pressure measuring means for measuring the pressure in said fluidized bed;

temperature measuring means for measuring the temperature of said fluidized bed in said fluidized bed furnace; and bed material transfer rate instructing means for instructing the transfer rate of said bed material to said bed material transferring means.

5. A combined cycle power generating plant including a fluidized bed furnace having a heat exchanger disposed therein, a steam turbine which is driven by steam generated in the heat exchanger and a gas turbine which is driven by combustion gas generated in the fluidized bed furnace;

the improvement comprising:

gas turbine output increasing means for increasing said gas turbine output preferentially to said steam turbine output; and instructing means for instructing said gas turbine output increasing means to increase the output therefrom in response to an instruction to increase the outputs from both said gas and steam turbines, and further including a compressor for supplying compressed air to said fluidized bed furnace, said compressor being connected to said gas turbine so that said compressor may be driven by said gas turbine, and in which said gas turbine output increasing means includes an auxiliary compressor for increasing the pressure of the combustion gas supplied to said gas turbine in response to an instruction from said instructing means to increase the output of said gas turbine, and further including a storage tank for storing a bed material which will form a fluidized bed;

bed material transferring means for transferring said bed material between said storage tank and said fluid bed furnace;

pressure measuring means for measuring the pressure in said fluidized bed;

temperature measuring means for measuring the temperature of said fluidized bed in said fluidized bed furnace; and bed material transfer rate instructing means for instructing the transfer rate of said bed material to said bed material transferring means.

6. A combined cycle power generating plant including a fluidized bed furnace having a heat exchanger disposed therein, a steam turbine which is driven by steam generated in the heat exchanger and a gas turbine which is driven by combustion gas generated in the fluidized bed furnace;

the improvement comprising:

gas turbine output increasing means for increasing said gas turbine output preferentially to said steam turbine output; and instructing means for instructing said gas turbine output increasing means to increase the output therefrom in response to an instruction to increase the outputs from both said gas and steam turbines, and further including a compressor for supplying compressed air to said fluidized bed furnace and in which said gas turbine output increasing means includes an exhaust gas line for introducing exhaust gas from said gas turbine to said compressor; and an exhaust gas flow control valve for increasing the flow rate of the exhaust gas introduced to said compressor in response to an instruction from said instructing means to increase the output from said gas turbine, and further including a compressor for supplying compressed air to said fluidized bed furnace, said compressor being connected to said gas turbine so that said compressor may be driven by said gas turbine, and in which said gas turbine output increasing means includes a subsidiary compressor for increasing the pressure of the combustion gas supplied to said gas turbine in response to an instruction from said instructing means to increase the output of said gas turbine, and further including a storage tank for storing a bed material which will form a fluidized bed;

bed material transferring means for transferring said bed material between said storage tank and said fluidized bed furnace;

pressure measuring means for measuring the pressure in said fluidized bed;

temperature measuring means for measuring the temperature of said fluidized bed in said fluidized bed furnace; and bed material transfer rate instructing means for instructing the transfer rate of said bed material to said bed material transferring means.

* * * * *